W. P. ALLEN.
CHAIN LINK.
APPLICATION FILED AUG. 7, 1911.
1,063,493.
Patented June 3, 1913.
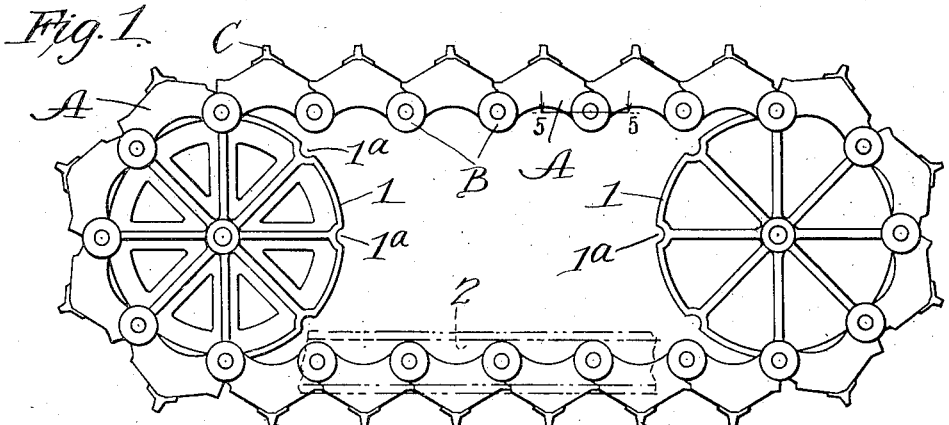
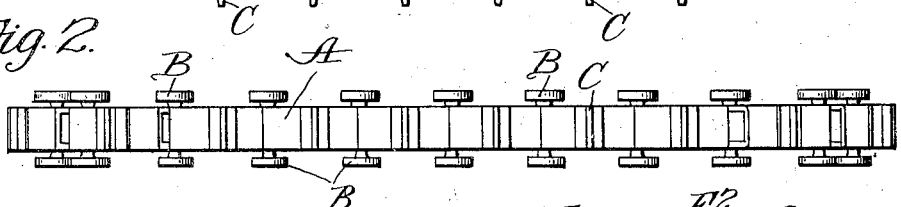
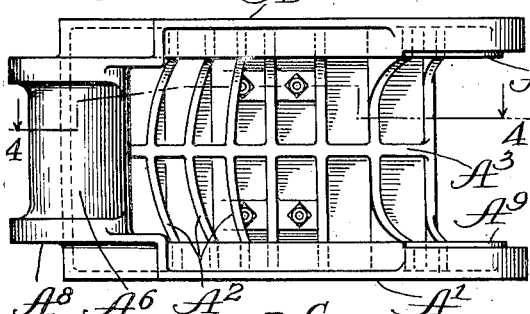
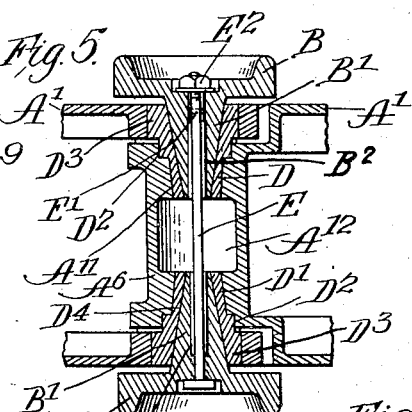
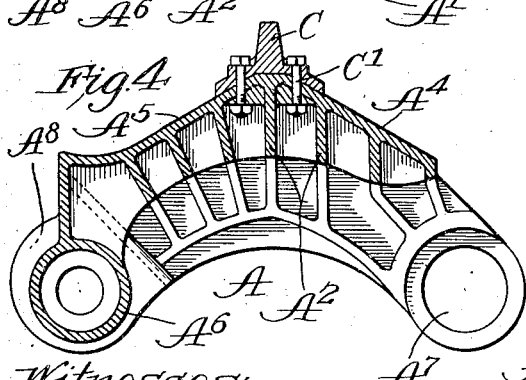
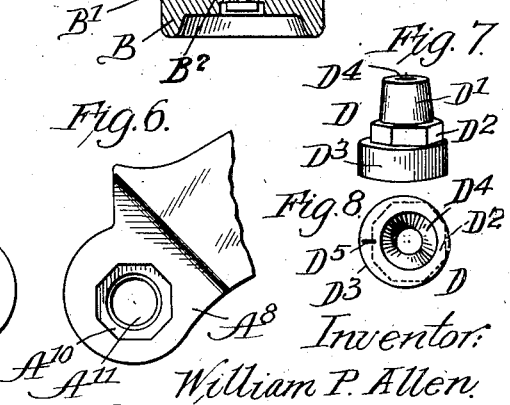
Witnesses:
P. J. Gathmann
Robt. N. Burton
Inventor:
William P. Allen,
By Burton & Burton
Attorneys.

UNITED STATES PATENT OFFICE.

WILLIAM P. ALLEN, OF LITTLE ROCK, ARKANSAS.

CHAIN-LINK.

1,063,493.

Specification of Letters Patent.

Patented June 3, 1913.

Application filed August 7, 1911. Serial No. 642,764.

*To all whom it may concern:*

Be it known that I, WILLIAM P. ALLEN, a citizen of the United States, residing at Little Rock, in the county of Pulaski and State of Arkansas, have invented new and useful Improvements in Chain-Links, of which the following is a specification, reference being had to the accompanying drawings, forming a part thereof.
The purpose of this invention is to provide an improved form of link to be used in a tractor chain.

It consists of the features and elements described and shown in the drawings as indicated in the claims.

In the drawings: Figure 1 is an elevation of a tractor chain composed of links of the form embodying this invention, the said chain being diagrammatically shown as mounted about a pair of tractor wheels formed to serve as sprocket wheels for the chain. Fig. 2 is a plan view of the chain illustrated in Fig. 1. Fig. 3 is a bottom plan view of a single link of the chain shown in Figs. 1 and 2. Fig. 4 is a sectional elevation taken as indicated at line 4—4 on Fig. 3. Fig. 5 is an enlarged detail section taken as indicated at line 5—5 on Fig. 1. Fig. 6 is a side elevation of one end of the link illustrated in Figs. 3 and 4, the remainder of the link being broken away. Fig. 7 is a perspective view of an adjustable bearing stud for the chain link. Fig. 8 is a bottom plan view of the stud illustrated in Fig. 7.
As may be understood from Fig. 1, the chain link which is the subject of this invention is intended to be employed as an element of a chain adapted for use in a tractor of the "caterpillar" type, that is,—in which an endless chain running upon driving sprockets comes directly in contact with the road surface and itself exerts the tractive effort of the machine. Fig. 1 illustrates a pair of sprocket wheels, 1, 1, about which the chain composed of the links, A, is mounted, while a bar or track, 2, positioned in the interval between the wheels, 1, 1, serves to transmit the load to that portion of the chain which is not directly supported on the wheels, so as to keep the chain properly alined and in contact with the road surface. The chain is provided with rollers, B, designed to run upon the track, 2, and to reduce wear and friction to a minimum at this point. It may be understood that any convenient form of power plant supported in any convenient manner upon the wheels, 1, 1, may be employed for rotating them, and thus for driving the chain about them and propelling the vehicle with which the tractor is associated.

The general function of the tractor chain having now been explained, the description from this point will be limited to the detail construction of a single link of the chain.
Referring to Figs. 3 and 4, it may be noted that the link, A, is a casting of hollow or honeycombed construction, its side walls, $A^1$, being connected by a series of arched ribs, $A^2$, and the spaces between these ribs being further subdivided by a medial longitudinal spine, $A^3$. The top or road-engaging surface of the link is composed of a pair of flat faces, $A^4$ and $A^5$, inclined to each other at an angle of about 120 degrees, and capped along their line of intersection by an applied transverse rib, C, which is secured to the main casting of the link, A, by four small bolts, $C^1$. By reference to Fig. 1, it will be seen that this applied element, C, is the first portion of the link to engage the road surface and is consequently subjected to the greatest wear in use; it is therefore desirable that this portion of the link be made removable and replaceable in order to save the cost of replacing the entire link, which would amount to replacing the entire chain whenever this portion of the links should become unduly worn down. The sloping face, $A^5$, is continued in a curve which is designed to blend with the adjacent face, $A^4$, of the next succeeding link in the chain so that the road engaging portion of the chain shall present as nearly as possible a continuous inclosed wall, in order that the minimum amount of dust shall be collected by the chain from the road. At one end of the link the side walls, $A^1$, are connected by a cross bar, $A^6$, while at the other end the walls are separated by a distance just equal to the length of this bar, $A^6$, and the walls at this end are apertured at, $A^7$, to serve as lugs for connecting the link with the next adjacent link by means hereinafter to be described, engaging the cross bar thereof. The end surfaces, $A^8$, of the crossbar, $A^6$, and the inside wearing surfaces, $A^9$, of the lugs are dressed smooth, so that the successive links will fit nicely together that there may be no undue friction between these surfaces. The outside diameter of the bar, $A^6$, is such that it will fit readily into the hollow or cradle, 1ª, of the sprocket wheel, 1, this being the mode by which there is secured a driving engagement between the sprocket wheel and the chain.

Fig. 5, in conjunction with the remaining figures indicates the manner in which any two successive links of the chain are connected together. The cross-bar $A^6$, of one link having been inserted between the lugs of the other link, the two links may be connected together by a pair of specially formed studs, D, one of which is shown in perspective in Fig. 7. This stud comprises a frusto-conical shank, $D^1$, extending from an octagonal portion, $D^2$, of slightly greater diameter than the shank, $D^1$, and this latter portion is surmounted by a cylindrical head, $D^3$, formed eccentrically with respect to the common axis of the portions, $D^1$ and $D^2$, the whole fitting being apertured along this axis at, $D^4$. As may be seen from Fig. 6, each end of the cross-bars, $A^6$, is provided with an octagonal opening at, $A^{10}$, which is continued into the interior of the bar in the form of a frusto-conical aperture, $A^{11}$, leading into the interior cored-out chamber, $A^{12}$, of the bar. Thus the bar is adapted at each end to receive one of the studs, D, which is held against turning therein by virtue of its octagonal portion, $D^2$, fitting into the octagonal opening, $A^{10}$, of the bar. The eccentric head, $D^3$, of each stud, D, constitutes the real bar with respect to the adjacent link, since it enters the aperture, $A^7$, and serves as the pivotal connection between the two links. The purpose of the eccentricity of the head, $D^3$, is to permit the stud, D, to be adjusted to compensate for any wear on the cross-bar, $A^6$, so that the effective length of the link may be maintained as nearly constant as possible, in order that the hollows, 1ª of the sprocket wheels, 1, may not become malformed on account of any variation in the length of the links, A. This adjustment may be readily effected by withdrawing the stud far enough to release its octagonal portion, $D^2$, from the octagonal cavity, $A^{10}$,—then rotating it through one eighth of a turn and replacing it with the octagonal portions of stud and cross-bar again in contact. If in practice it be found that the greatest wear comes either on the heads, $D^3$, of the studs or on the circular walls of the apertures, $A^7$, this sort of adjustment will operate to take up such wear just as effectively as it may serve to compensate for the wear on the cross-bar, $A^6$. An index mark, $D^5$, placed on the flat face of the head, $D^3$, serves to assist the operator in making a uniform adjustment throughout the chain. The studs, $D^4$, are conically apertured to serve as journal bearings for the frusto-conical axles, $B^1$, of the rollers, B; and to keep the rollers and studs in place, a tie-bolt, E, extends through the rollers, B. The axial aperture, $B^2$, which accommodates the tie-bolt, E, is reduced near the outer end in each roller, and in one of them this reduced portion contains a pair of grooves parallel to the axis, into which there extends a pin, $E^1$, carried transversely in the bolt to cause the latter to turn with the rollers, and thus to prevent its nut, $E^2$, from working loose.

From the foregoing it will be seen that a chain made up of the links above described is adapted for a long life in the use for which it is intended, since the traction shoes, C, may be easily and cheaply replaced as fast as they wear down, and since the comparatively slow wear of the studs, D, or the cross-bar, $A^6$, can be gradually compensated by the adjustment of the studs, D. Obviously the effectiveness of this type of adjustment is not dependent upon the use of octagonally formed studs, D, but the portion, $D^2$, may be made in the form of a regular polygon of any desired number of sides. The width of the chain relative to the width of the machine upon which it is used, is not material in relation to this invention, since a single chain or a plurality of chains may be employed on the tractor.

I claim:—

1. A chain comprising links and pivots connecting them, said pivots each comprising two portions, one eccentric to the other, said portions engaging the connected ends of adjacent links, respectively, and means for securing the pivots against rotation in one of the links.

2. A chain comprising links and pivots connecting them, said pivots each comprising two portions, one portion being formed regularly about an axis, the other portion being of circular cross section eccentric to said axis, said portions engaging the connected ends of adjacent links, respectively, and the links being adapted to hold the regularly formed portions of said pivots against rotation.

3. A sprocket chain comprising links each of which consists of side bars and a cross bar connecting them at one end, link pivots each consisting of two portions one eccentric to the other, the cross bar of each link being recessed to receive one portion of a link pivot and the side bars being each apertured at the other end of the link to receive the other portion of the link pivot, and means for securing one portion of the pivot against rotation in the link.

4. A sprocket chain comprising links each of which consists of side bars and a cross bar connecting them at one end, the other end of each side bar being apertured to receive a pivot, a pair of link pivots each comprising two portions, one portion being formed regularly about an axis and the other portion being of circular cross section eccentric to said axis, the cross bar being recessed at both ends to receive the said regularly formed portions of the pivots, and the apertures in the side bars being adapted to receive the circular portions of the pivots, the link pivots being axially apertured, and a tie bolt passing through said axial apertures for securing the pivots in place.

5. A sprocket chain comprising links each of which consists of side bars and a cross bar connecting them at one end, the other end of each side bar being apertured to receive pivots, link pivots, each consisting of a tapered shank, a circular head eccentric thereto, a polygonal shoulder formed regularly about the axis of the shank adjacent to the head, the cross bar of each link being recessed to receive said shank and shoulder, the shoulder recess in said cross bar being formed to prevent rotation of the polygonal shoulder in the link and the apertures in the side bars being each adapted to receive the circular head of a pivot, each pivot being axially apertured, and a tie bolt passing through said axial aperture into the cross bar for securing the pivot in place.

In testimony whereof I have hereunto set my hand at Little Rock, Arkansas, this 2d day of Aug., 1911.

WILLIAM P. ALLEN.

Witnesses:
   Isaac Hicks,
   Sadie Howell.